(12) United States Patent
Tamura et al.

(10) Patent No.: US 9,118,537 B2
(45) Date of Patent: Aug. 25, 2015

(54) RECEPTION APPARATUS, COMMUNICATION APPARATUS, TRANSMISSION APPARATUS, RECEIVING METHOD, AND TRANSMITTING METHOD

(75) Inventors: Ryoko Tamura, Fukuoka (JP); Tetsuo Ehara, Fukuoka (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 13/279,976

(22) Filed: Oct. 24, 2011

(65) Prior Publication Data
US 2012/0099456 A1 Apr. 26, 2012

(30) Foreign Application Priority Data

Oct. 25, 2010 (JP) ................................ 2010-238523

(51) Int. Cl.
H04J 3/16 (2006.01)
H04L 12/701 (2013.01)
H04L 12/801 (2013.01)
H04L 12/931 (2013.01)
H04L 12/935 (2013.01)

(52) U.S. Cl.
CPC ................ H04L 45/00 (2013.01); H04L 47/10 (2013.01); H04L 49/205 (2013.01); H04L 49/3027 (2013.01); H04L 49/3045 (2013.01)

(58) Field of Classification Search
CPC .. H04L 2012/5651; H04L 47/24; H04L 47/32
USPC .................. 370/235, 252, 417, 466
See application file for complete search history.

(56) References Cited

U.S. PATENT DOCUMENTS

| | | | | |
|---|---|---|---|---|
| 6,636,481 | B1 * | 10/2003 | Yamaguchi et al. | 370/230 |
| 6,826,150 | B1 * | 11/2004 | Bhattacharya et al. | 370/230 |
| 6,963,578 | B2 * | 11/2005 | Akahane et al. | 370/417 |
| 7,065,089 | B2 * | 6/2006 | Kuhl et al. | 370/395.2 |
| 7,130,903 | B2 * | 10/2006 | Masuda et al. | 709/225 |
| 7,184,437 | B1 * | 2/2007 | Cole et al. | 370/392 |
| 7,277,386 | B1 * | 10/2007 | Ferguson et al. | 370/230 |
| 7,385,997 | B2 * | 6/2008 | Gorti et al. | 370/415 |
| 7,433,953 | B1 * | 10/2008 | Kappler et al. | 709/226 |
| 7,433,963 | B2 * | 10/2008 | Anschutz | 709/236 |
| 7,440,460 | B2 * | 10/2008 | Wybenga et al. | 370/395.31 |
| 7,725,886 | B2 * | 5/2010 | Kunze et al. | 717/159 |
| 7,835,290 | B2 * | 11/2010 | Song et al. | 370/241.1 |
| 8,085,790 | B2 * | 12/2011 | Klessig et al. | 370/398 |
| 8,144,710 | B2 * | 3/2012 | McGuire et al. | 370/392 |
| 8,456,995 | B2 * | 6/2013 | Fujihira et al. | 370/235 |
| 8,797,866 | B2 * | 8/2014 | Leavy et al. | 370/232 |
| 2002/0012348 | A1 | 1/2002 | Mizuhara et al. | |
| 2008/0013547 | A1 * | 1/2008 | Klessig et al. | 370/395.53 |
| 2008/0198814 | A1 | 8/2008 | Wengerter et al. | |
| 2012/0051358 | A1 * | 3/2012 | Bellagamba et al. | 370/390 |

FOREIGN PATENT DOCUMENTS

| | | |
|---|---|---|
| JP | 2002-44139 A | 2/2002 |
| JP | 2008-502238 | 1/2008 |

* cited by examiner

*Primary Examiner* — Brian O'Connor
(74) *Attorney, Agent, or Firm* — Fujitsu Patent Center

(57) ABSTRACT

A reception apparatus includes a receiver configured to receive a packet including a label and quality information indicating communication quality for the packet. The reception apparatus also includes a processor configured to allocate a priority to the received packet based on a combination of the label and the quality information included in the received packet and a transmitter configured to supply the packet to which the priority is allocated to a switch that performs transfer control to a packet based on its priority.

12 Claims, 15 Drawing Sheets

FIG. 8

MEMORY (RECEPTION SIDE) 112

LABEL TABLE 800

| ADDRESS | SEARCH KEY | | | | SEARCH DATA | | | |
|---|---|---|---|---|---|---|---|---|
| | LABEL | TC VALUE | V | COLOR MODE | CLASS PRIORITY | LOSS PRIORITY | DESTINATION CARD NUMBER | DESTINATION PORT NUMBER |
| 0 | 1 | 0 | 1 | 1 | 0 | GREEN | CARD #1 | PORT #1 |
| 1 | 2 | 1 | 1 | 1 | 0 | YELLOW | CARD #1 | PORT #1 |
| 2 | 3 | 2 | 1 | 1 | 1 | GREEN | CARD #2 | PORT #1 |
| 3 | 4 | 3 | 1 | 1 | 2 | YELLOW | CARD #3 | PORT #2 |
| 4 | 5 | 4 | 1 | 1 | 3 | GREEN | CARD #4 | PORT #3 |
| 5 | 6 | 5 | 1 | 1 | 4 | YELLOW | CARD #4 | PORT #1 |
| 6 | 7 | 6 | 1 | 1 | 4 | GREEN | CARD #3 | PORT #2 |
| 7 | 8 | 0 | 1 | 1 | 0 | YELLOW | CARD #4 | PORT #3 |
| ... | ... | ... | ... | ... | ... | ... | ... | ... |
| 8388607 | MASK | MASK | 0 | MASK | MASK | MASK | MASK | MASK |

FIG. 9

MEMORY (RECEPTION SIDE) 112

LABEL TABLE 901

| ADDRESS | SEARCH KEY | | | SEARCH DATA | | |
|---|---|---|---|---|---|---|
| | LABEL | V | COLOR MODE | PROFILE NUMBER | DESTINATION CARD NUMBER | DESTINATION PORT NUMBER |
| 0 | 1 | 1 | 1 | 0 | CARD#1 | PORT#1 |
| 1 | 2 | 1 | 1 | 0 | CARD#1 | PORT#1 |
| 2 | 3 | 1 | 1 | 1 | CARD#2 | PORT#1 |
| 3 | 4 | 1 | 1 | 2 | CARD#3 | PORT#2 |
| 4 | 5 | 1 | 1 | 3 | CARD#4 | PORT#3 |
| 5 | 6 | 1 | 1 | 4 | CARD#4 | PORT#1 |
| 6 | 7 | 1 | 1 | 4 | CARD#3 | PORT#2 |
| 7 | 8 | 1 | 1 | 0 | CARD#4 | PORT#3 |
| ... | ... | ... | ... | ... | ... | ... |
| 1048575 | MASK | 0 | MASK | MASK | MASK | MASK |

TC CLASS DETERMINATION TABLE 902

| ADDRESS | | DATA | |
|---|---|---|---|
| PROFILE NUMBER | TC VALUE | CLASS PRIORITY | LOSS PRIORITY |
| 0 | 0 | 0 | GREEN |
| 0 | 1 | 0 | YELLOW |
| 0 | 2 | 0 | GREEN |
| 0 | 3 | 0 | YELLOW |
| 0 | 4 | 4 | GREEN |
| 0 | 5 | 3 | YELLOW |
| 0 | 6 | 1 | GREEN |
| 0 | 7 | 1 | YELLOW |
| ... | ... | ... | ... |
| 15 | 7 | 0 | GREEN |

ADDRESS: 0, 1, 2, 3, 4, 5, 6, 7, ..., 127

FIG. 10

MEMORY (TRANSMISSION SIDE) 132

LABEL TABLE 1001

| | SEARCH KEY | | | SEARCH DATA | | |
|---|---|---|---|---|---|---|
| ADDRESS | LABEL | V | SWAP FLAG | PROFILE NUMBER | DESTINATION PORT NUMBER | |
| 0 | 1 | 1 | ON | 0 | PORT#1 | |
| 1 | 2 | 1 | ON | 0 | PORT#2 | |
| 2 | 3 | 1 | ON | 1 | PORT#3 | |
| 3 | 4 | 1 | ON | 2 | PORT#4 | |
| 4 | 5 | 1 | ON | 3 | PORT#5 | |
| 5 | 6 | 1 | ON | 4 | PORT#6 | |
| 6 | 7 | 1 | ON | 4 | PORT#1 | |
| 7 | 8 | 1 | ON | 0 | PORT#2 | |
| ... | ... | ... | ... | ... | ... | |
| | MASK | 0 | MASK | MASK | MASK | |

TC CLASS DETERMINATION TABLE 1002

| | ADDRESS | | DATA |
|---|---|---|---|
| PROFILE NUMBER | CLASS PRIORITY | LOSS PRIORITY | TC VALUE |
| 1 | 0 | GREEN | 4 |
| 1 | 0 | YELLOW | 5 |
| 1 | 0 | GREEN | 6 |
| 1 | 0 | YELLOW | 7 |
| 2 | 4 | GREEN | 4 |
| 2 | 3 | YELLOW | 5 |
| 2 | 1 | GREEN | 6 |
| 2 | 1 | YELLOW | 7 |
| ... | ... | ... | ... |
| 15 | 0 | GREEN | 7 |

| Address |
|---|
| 0 |
| 1 |
| 2 |
| 3 |
| 4 |
| 5 |
| 6 |
| 7 |
| ... | ically pointed out in the claims.

RECEPTION APPARATUS, COMMUNICATION APPARATUS, TRANSMISSION APPARATUS, RECEIVING METHOD, AND TRANSMITTING METHOD

CROSS-REFERENCE TO RELATED APPLICATION

This application is based upon and claims the benefit of priority of the prior Japanese Patent Application No. 2010-238523, filed on Oct. 25, 2010, the entire contents of which are incorporated herein by reference.

FIELD

The present invention relates to a reception apparatus, a communication apparatus, a transmission apparatus, a receiving method, and a transmitting method.

BACKGROUND

Multi-protocol label switching (MPLS) has heretofore been discussed, in which an identifier called a label is added to the beginning of each packet for transfer to achieve an increase in the communication speed and/or addition of functions. In the MPLS, a path called a Label Switched Path (LSP) is used to transfer packets.

A technology to classify packets and perform transfer control to the packets in accordance with the priorities based on the classes is proposed in order to provide Quality of Service (QoS) in communication systems. In the provision of the QoS in the MPLS, Label-only-inferred per hop behavior (PHB) scheduling class (PSC) LSP (L-LSP) or EXP-inferred PSC LSP (E-LSP) is used (for example, refer to Japanese Laid-open Patent Publication No. 2002-44139).

In the L-LSP, one LSP has one class and traffics are allocated to multiple LSPs having different classes. Accordingly, the label of each packet indicates the priority in the L-LSP. In the E-LSP, a Traffic Class (TC) value for identifying each class is written into a TC field (Exp field) of each label. Accordingly, the TC value of each packet indicates the priority in the E-LSP.

Since the method of identifying the priority in the E-LSP is different from that in the L-LSP, as described above, a communication apparatus performing the transfer control determines whether a packet that is a target for the transfer control is transferred on the E-LSP or the L-LSP. The communication apparatus allocates the priorities by using an E-LSP process and an E-LSP table for the packets on the E-LSP, and allocates the priorities by using an L-LSP process and an L-LSP table for the packets on the L-LSP.

SUMMARY

According to an aspect of the embodiment, an optical module includes a receiver configured to receive a packet including a label and quality information indicating communication quality for the packet; a processor configured to allocate a priority to the received packet based on a combination of the label and the quality information included in the received packet; and a transmitter configured to supply the packet to which the priority is allocated to a switch that performs transfer control to a packet based on its priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a specific first example of correspondence information stored in the reception-side line IF;

FIG. 9 illustrates a specific second example of the correspondence information stored in the reception-side line IF;

FIG. 10 illustrates a specific example of the correspondence information stored in a transmission-side line IF;

DESCRIPTION OF EMBODIMENTS

Embodiments of the present disclosure will herein be described in detail with reference to the attached drawings.

Figure 1:
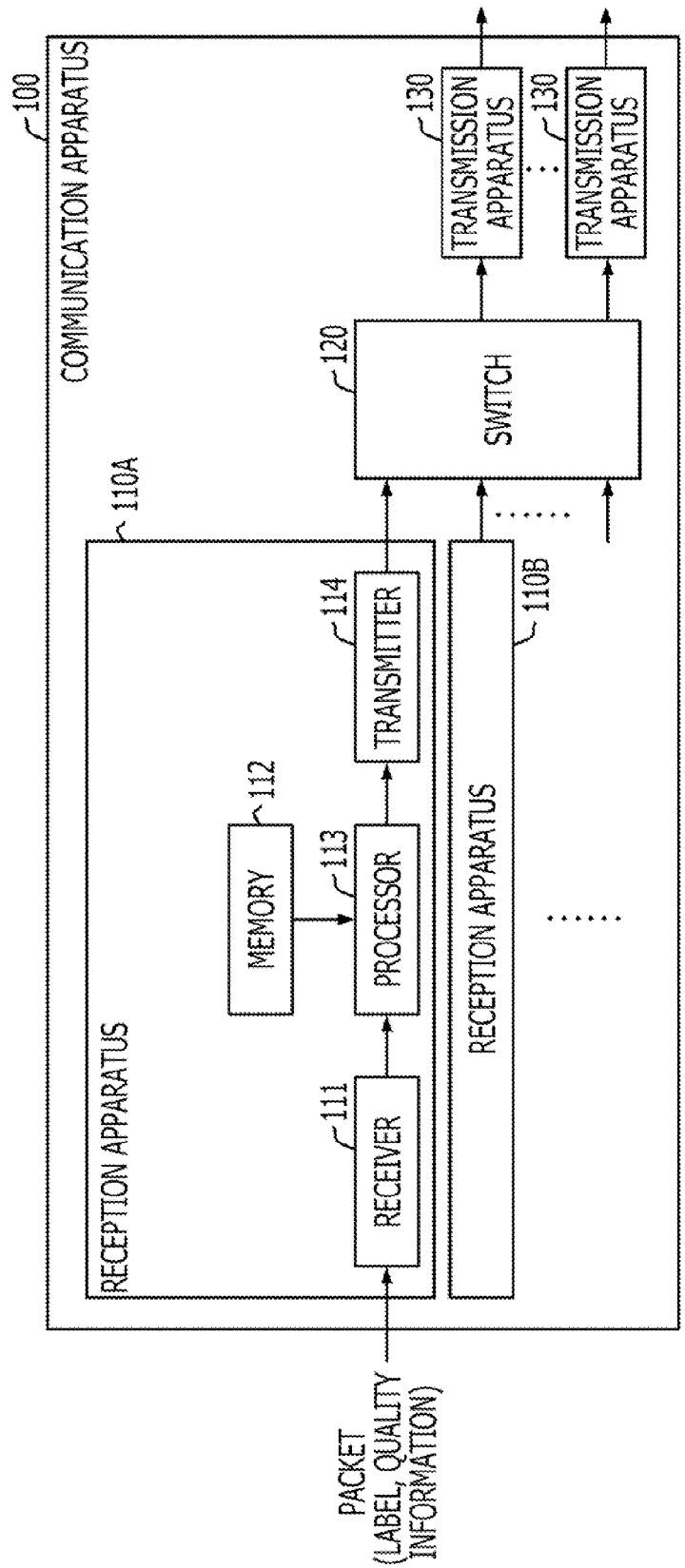
FIG. 1 is a block diagram illustrating an example of the configuration of a reception apparatus and a communication apparatus according to an embodiment of the present invention.

FIG. 1 is a block diagram illustrating an example of the configuration of a reception apparatus and a communication apparatus according to an embodiment. Referring to FIG. 1, a communication apparatus 100 according to the present embodiment includes multiple reception apparatuses 110A, 110B, . . . , a switch 120, and transmission apparatuses 130. Each of the reception apparatuses 110A, 110B, . . . receives a packet transmitted from an external communication apparatus and supplies the received packet to the switch 120. Each of the reception apparatuses 110A, 110B, . . . allocates a priority to each packet to be supplied to the switch 120.

The switch 120 performs transfer control (QoS control) to each packet supplied from the reception apparatuses 110A, 110B, . . . on the basis of the priority allocated to the packet. The transfer control in the switch 120 includes, for example, priority control in which the transmission order of packets is controlled on the basis of their priorities. The transfer control in the switch 120 may include bandwidth control in which packets are discarded depending on their priorities. The transfer control in the switch 120 may include the priority control and the bandwidth control.

The switch 120 supplies a packet to be transmitted by the transfer control to the transmission apparatus 130. The transmission apparatus 130 transmits the packet subjected to the transfer control by transmission control to an external communication apparatus. Specifically, the transmission apparatus 130 transmits the packet supplied from the switch 120. The respective packets received by the reception apparatuses 110A, 110B, . . . are capable of being transmitted from the transmission apparatus 130 through the transfer control in the switch 120 in the above manner.

The reception apparatus 110A includes a receiver 111, a memory 112, a processor 113, and a transmitter 114. The receiver 111 receives a packet including a label and quality information from an external communication apparatus. The label (flow identifier) is information indicating a user (flow) of the packet. The quality information indicates a communication quality that is preset for the packet (for example, indicates a TC value). The receiver 111 supplies the received packet to the processor 113.

The memory 112 stores correspondence information in which each combination of the label and the quality information is associated with the priority of each packet. The priority includes, for example, a class priority used in the priority control. The priority may include loss priority (color) used in the bandwidth control. Both the class priority and the loss priority may be used.

The processor 113 allocates the priority to each packet supplied from the receiver 111 on the basis of the correspondence information stored in the memory 112. Specifically, the processor 113 acquires the priority corresponding to the combination of the label and the quality information included in each packet from the correspondence information and allocates the acquired priority to the packet. For example, the processor 113 allocates at least one of the class priority and the loss priority to the packet. The processor 113 is, for example, a central processing unit (CPU).

The processor 113 supplies the packet to which the priority is allocated to the transmitter 114. For example, the processor 113 adds a header (an in-apparatus header) indicating the allocated priority to the packet and supplies the packet to which the header is added to the transmitter 114. The transmitter 114 supplies the packet supplied from the processor 113 to the switch 120.

The reception apparatus 110A receives, for example, an E-LSP packet (a first packet) the quality information (for example, the TC value) in which indicates the priority. Accordingly, the reception apparatus 110A allocates the priority on the basis of the combination of the label and quality information to allocate the priority for every user even in the E-LSP packet the quality information in which indicates the priority. Consequently, it is possible to realize flexible packet transfer.

The reception apparatus 110A may allocate the same priority to the combinations of a certain label and the respective pieces of quality information to allocate one priority to a specific user, as in the L-LSP. The reception apparatus 110A may allocate different priorities to the combinations of a certain label and the respective pieces of quality information to allocate multiple priorities to a specific user, as in the E-LSP. In addition, the reception apparatus 110A may receive an L-LSP packet (a second packet) the label in which indicates the priority. Accordingly, the reception apparatus 110A may allocate the priority on the basis of the combination of the label and the quality information to allocate the priority to the packet even if the L-LSP is not differentiated from the E-LSP. As a result, it is possible to reduce the amount of processing in the allocation of the priority, thereby increasing the processing speed and decreasing the electric power consumption.

Furthermore, the correspondence information common to the E-LSP and the L-LSP may be used to allocate the priority. In this case, the size of the correspondence information stored in the memory 112 is decreased, thereby increasing the processing speed in the allocation of the priority. An operator can set the correspondence information common to the L-LSP and the E-LSP to set policies (for example, the class priority and the loss priority) even if the operator is not aware of the L-LSP and the E-LSP. Accordingly, it is possible to easily set the policies. For example, commands (command line interfaces (CLIs)) set by the operator can be shared between the E-LSP and the L-LSP to decrease the number of command parameters, that is, simplify the commands.

The reception apparatuses 110B, . . . each have a configuration similar to that of the reception apparatus 110A. Accordingly, the reception apparatuses 110B, . . . can allocate the priority for every user even for the E-LSP packet. In addition, it is possible to decrease the amount of processing in the allocation of the priority in the reception apparatuses 110B, . . . to decrease the size of the correspondence information stored in the reception apparatuses 110B, . . . .

Figure 2:
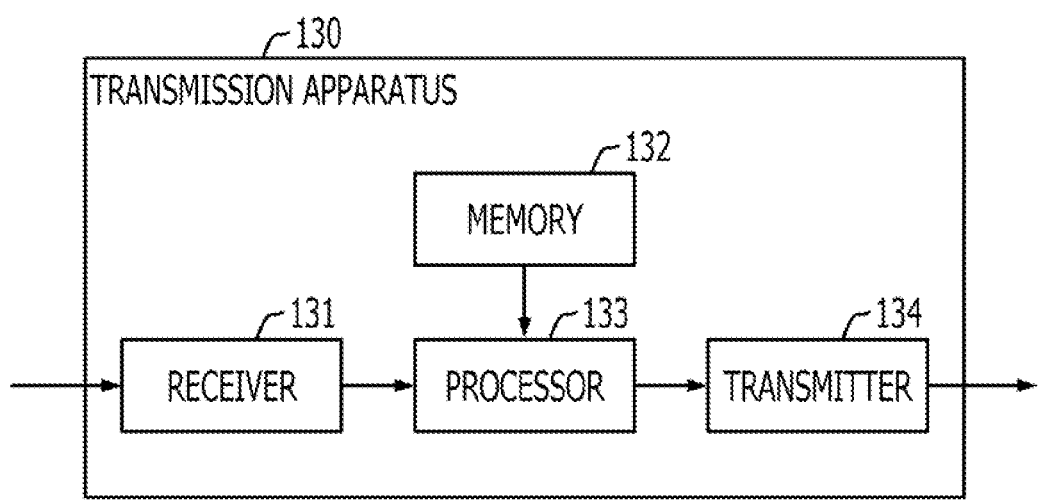
FIG. 2 is a block diagram illustrating a specific example of the configuration of a transmission apparatus.

FIG. 2 is a block diagram illustrating a specific example of the configuration of a transmission apparatus. The transmission apparatus illustrated in FIG. 2 is the transmission apparatus 130 illustrated in FIG. 1. Referring to FIG. 2, the transmission apparatus 130 includes a receiver 131, a memory 132, a processor 133, and a transmitter 134. The receiver 131 receives a packet from the switch 120. The receiver 131 supplies the received packet to the processor 133.

The memory 132 stores correspondence information in which each combination of the label and the priority is associated with the quality information (for example, the TC value) about each packet. The priority includes, for example, the class priority. The priority may include the loss priority (color). Both the class priority and the loss priority may be used.

The processor 133 allocates the quality information to each packet supplied from the receiver 131 on the basis of the correspondence information stored in the memory 132. Specifically, the processor 133 acquires the quality information corresponding to the combination of the label and the priority included in each packet from the correspondence information and allocates the acquired quality information to the packet. For example, the processor 133 stores the acquired quality information in a TC field (refer to FIG. 6) of the packet (overwrites the TC field of the packet with the acquired quality information). The processor 133 supplies the packet to which the quality information is allocated to the transmitter 134. The transmitter 134 transmits the packet supplied from the processor 133 to an external communication apparatus.

Accordingly, the processor 133 allocates the quality information on the basis of the combination of the label and priority to allocate the quality information for every user even in the E-LSP packet the priority of which corresponds to the quality information. Consequently, it is possible to realize flexible packet transfer. In addition, the same quality information may be allocated to combinations of a certain label and the respective priorities to allocate one piece of quality information to a certain user, as in the L-LSP. Alternatively, different pieces of quality information may be allocated to combinations of a certain label and the respective priorities to allocate multiple pieces of quality information to a certain user, as in the E-LSP.

The processor 133 may allocate the quality information on the basis of the combination of the label and the priority to allocate the quality information to the packet even if the L-LSP is not differentiated from the E-LSP. As a result, it is possible to reduce the amount of processing in the allocation of the priority, thereby increasing the processing speed and decreasing the electric power consumption. The processor 133 is, for example, a CPU.

Furthermore, the correspondence information common to the E-LSP and the L-LSP may be used to allocate the quality information. In this case, the size of the correspondence information stored in the memory 132 is decreased, thereby increasing the processing speed in the allocation of the quality information. The operator can set the correspondence information common to the L-LSP and the E-LSP to set policies (for example, the quality information) even if the operator is not aware of the L-LSP and the E-LSP. Accordingly, it is possible to easily set the policies. For example, commands (CLIs) set by the operator can be shared between the E-LSP and the L-LSP to decrease the number of command parameters, that is, simplify the commands.

Figure 3:
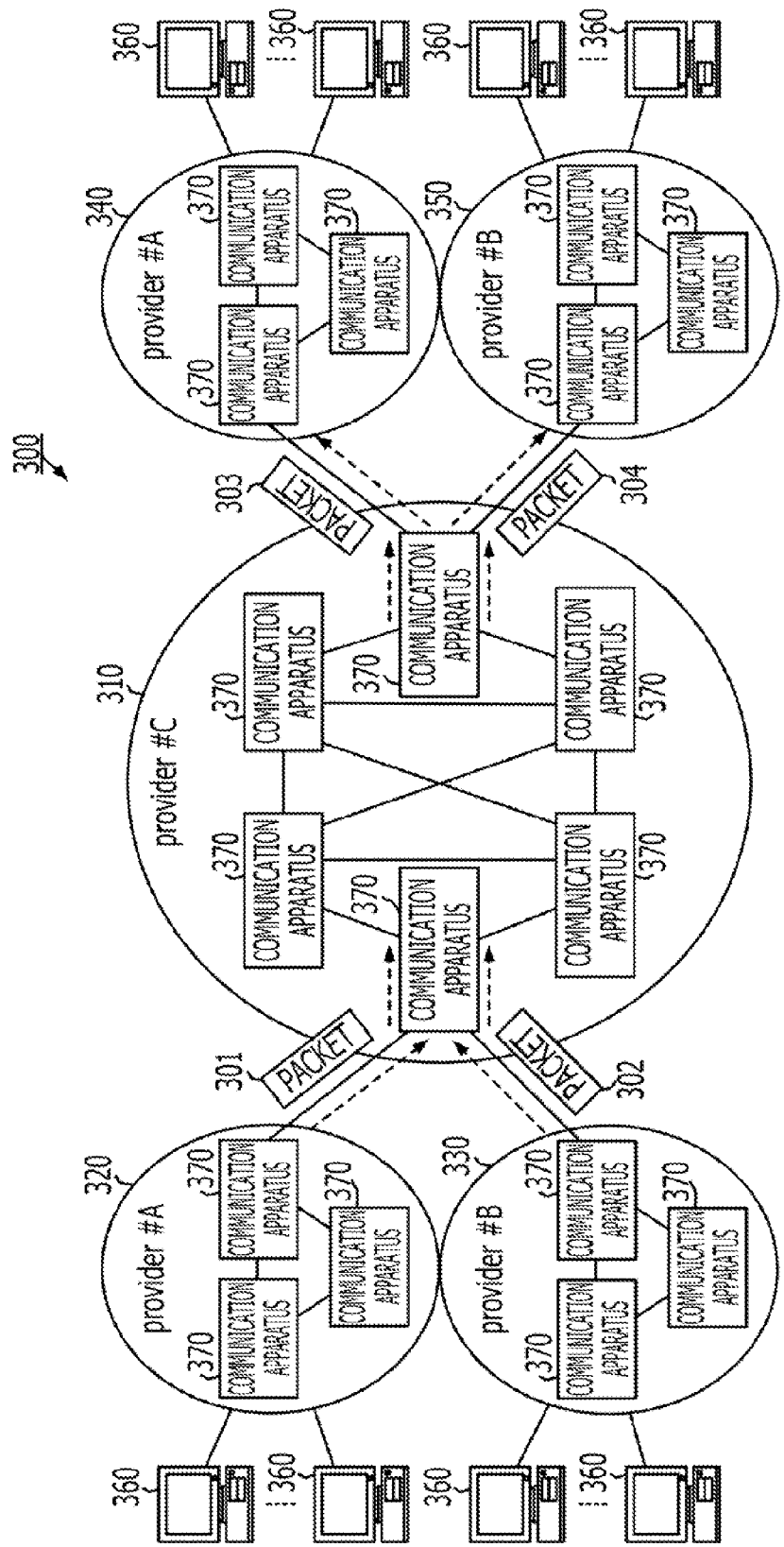
FIG. 3 illustrates a specific example of a communication system to which the communication apparatus is applied.

FIG. 3 illustrates a specific example of a communication system to which a communication apparatus is applied. The communication apparatus 100 illustrated in FIG. 1 is applied to a communication system 300 illustrated in FIG. 3. The communication system 300 includes an upper-level MPLS network 310, lower-level MPLS networks 320, 330, 340, and 350, and multiple user terminals 360.

The MPLS network 310 is a communication network toward a basic network, compared with the MPLS networks 320, 330, 340, and 350. The MPLS networks 320, 330, 340, and 350 are each provided between the MPLS network 310 and the user terminals 360. The MPLS networks 320 and 340 are provided by a provider #A. The MPLS networks 330 and 350 are provided by a provider #B. The MPLS network 310 is provided by a provider #C.

The MPLS networks 310, 320, 330, 340, and 350 each include multiple communication apparatuses 370 that are coupled to each other. The communication apparatus 100 in FIG. 1 may be applied to each of the communication apparatuses 370. Each communication apparatus 370 in the MPLS networks 310, 320, 330, 340, and 350 receives a packet transmitted from the user terminal 360 or another MPLS network and transfers the packet to a certain destination based on, for example, the address included in the received packet. The transfer of a packet by each communication apparatus is performed by, for example, statistical multiplexing.

For example, the communication apparatus 100 is applied to the communication apparatus 370 in the MPLS network 310, which receives a packet 301 transmitted from the MPLS network 320 to the MPLS network 310 and a packet 302 transmitted from the MPLS network 330 to the MPLS network 310. Accordingly, the MPLS network 320 and the MPLS network 330 having different policies are accommodated in the MPLS network 310.

For example, since the lower-level MPLS networks 320 and 330 have different source providers (or carriers), the same TC value may mean different priorities. Even in such a case, the priorities can be allocated for every user in the communication apparatus 370 in the MPLS network 310 to apply the policies of different priorities to different users even with the same TC value. The priorities can be allocated for every user in the communication apparatus 370 in the MPLS network 310 to absorb the difference in the policy between the lower-level MPLS networks 320 and 330.

For example, the communication apparatus 100 is applied to the communication apparatus 370 in the MPLS network 310, which transmits a packet 303 transmitted from the MPLS network 310 to the MPLS network 340 and a packet 304 transmitted from the MPLS network 310 to the MPLS network 350. Accordingly, the MPLS network 340 and the MPLS network 350 having different policies are accommodated in the MPLS network 310.

For example, since the lower-level MPLS networks 340 and 350 have different source providers (or carriers), different TC values may correspond to the same priority. Even in such a case, the TC value can be allocated for every user in the communication apparatus 370 in the MPLS network 310 to apply the policies of different TC value to different users even with the same priority. The TC value can be allocated for every user in the communication apparatus 370 in the MPLS network 310 to absorb the difference in the policy between the lower-level MPLS networks 340 and 350.

Figure 4:
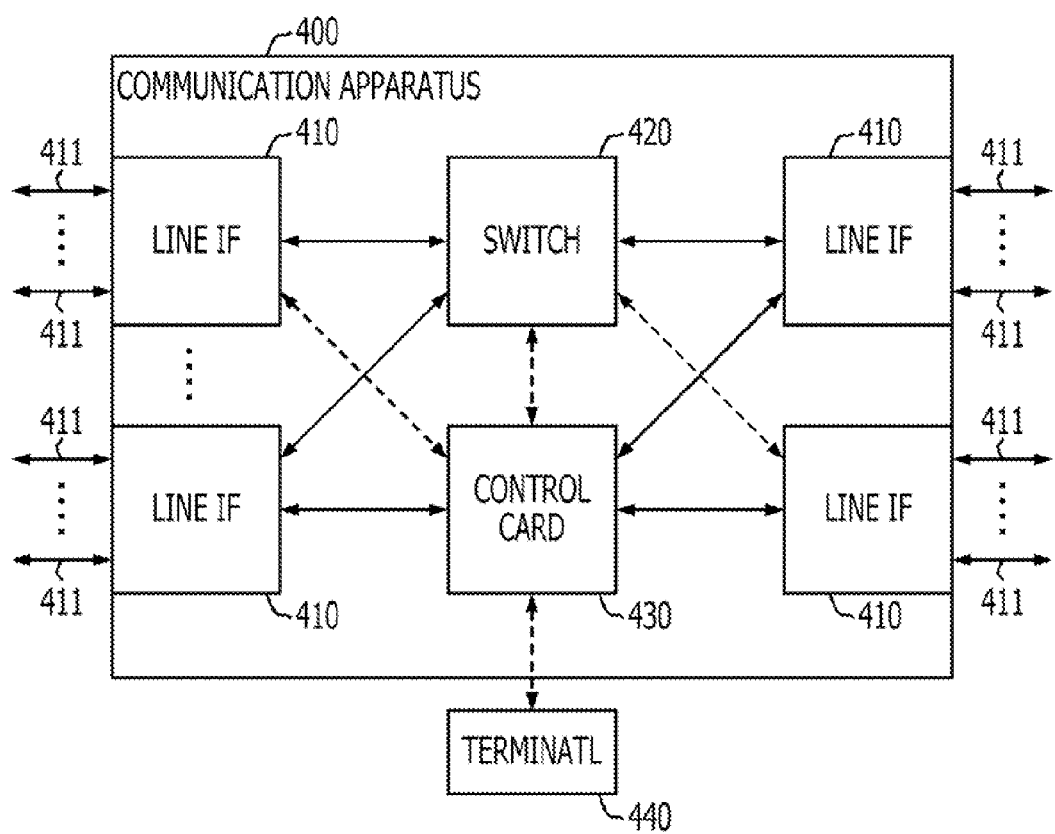
FIG. 4 illustrates a specific example of a communication apparatus.

FIG. 4 illustrates a specific example of a communication apparatus. A communication apparatus 400 illustrated in FIG. 4 is a specific example of the communication apparatus 370 illustrated in FIG. 3. In the example in FIG. 4, solid-line arrows indicate the flows of data signals and broken-line arrows indicate the flows of control signals. Referring to FIG. 4, the communication apparatus 400 includes multiple line interfaces (IFs) 410, a switch 420, and a control card 430. A control terminal 440 is coupled to the communication apparatus 400.

Each of the line IFs 410 has the configuration corresponding to that of the reception apparatuses 110A, 1108, . . . , or the transmission apparatus 130 illustrated in FIG. 1. The switch 420 has the configuration corresponding to that of the switch 120 illustrated in FIG. 1. The line IFs 410, the switch 420, and the control card 430 may be each realized by a module or a card removably loaded in a slot of the communication apparatus 400. The line IFs 410, the switch 420, and the control card 430 may be incorporated into the communication apparatus 400 in advance.

Each of the line IFs 410 accommodates multiple line ports 411 and transmits and receives a packet to and from an external communication apparatus. The switch 420 is a congestion point of the packets in the communication apparatus 400. Specifically, the switch 420 is coupled to the multiple line IFs 410 and performs the transfer control of the packets between the multiple line IFs 410.

The control card 430 controls the line IFs 410 and the switch 420 on the basis of, for example, a control command transmitted from the control terminal 440. In addition, the control card 430 transmits information indicating the result of the control to the control terminal 440. The control terminal 440 accepts an operation by the operator and transmits a control command to the control card 430 in accordance with the accepted operation. In addition, the control terminal 440 notifies the operator of information transmitted from the control card 430.

Figure 5:
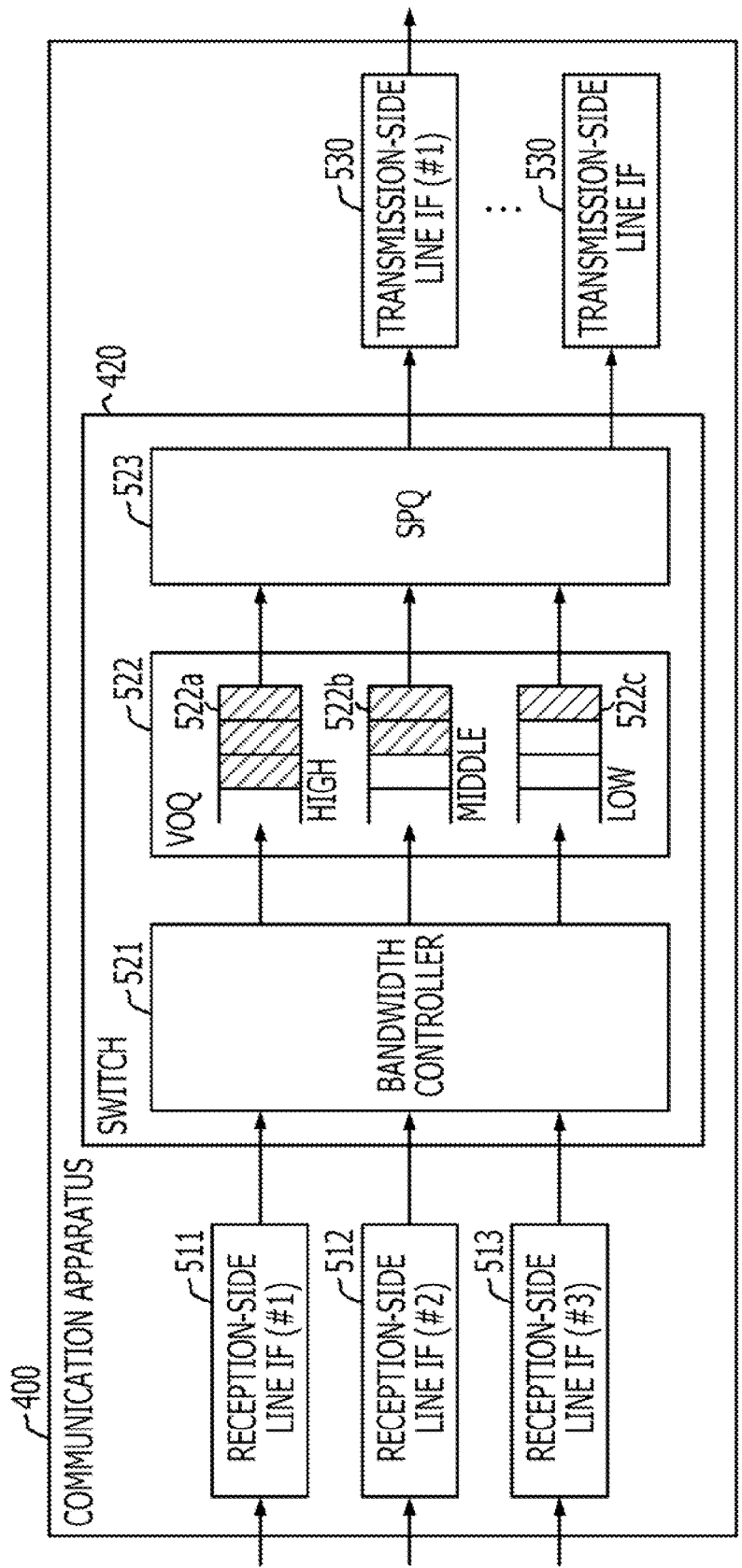
FIG. 5 illustrates an example of part of the configuration of the communication apparatus.

FIG. 5 illustrates an example of part of the configuration of the communication apparatus. Reception-side line IFs 511 to 513 (#1 to #3) illustrated in FIG. 5 are part of the multiple line IFs 410 illustrated in FIG. 4 and are line IFs at the side of reception (input) of the communication apparatus 400. The reception-side line IFs 511 to 513 each correspond to the reception apparatus 110A illustrated in FIG. 1 and has the same configuration as that of the reception apparatus 110A. The reception-side line IFs 511 to 513 each supply a packet received from an external communication apparatus to the switch 420. The reception-side line IFs 511 to 513 each allocate the class priority and the loss priority to a packet to be supplied to the switch 420.

A transmission-side line IF 530 (#1) illustrated in FIG. 5 is part of the multiple line IFs 410 illustrated in FIG. 4 and is a line IF at the side of transmission (output) of the communication apparatus 400. The transmission-side line IF 530 corresponds to the transmission apparatus 130 illustrated in FIG.

1 and FIG. 2 and has the same configuration as that of the transmission apparatus 130 illustrated in FIG. 2. The transmission-side line IF 530 transmits a packet supplied from the switch 420 to an external communication apparatus.

The switch 420 performs the transfer control of each packet supplied from the reception-side line IFs 511 to 513 for the transmission-side line IF 530. Specifically, the switch 420 includes a bandwidth controller 521, a virtual output queue (VOQ) 522, a strict priority queuing (SPQ) 523.

The bandwidth controller 521 performs the bandwidth control in which the packets supplied from the reception-side line IFs 511 to 513 are discarded depending on their priorities. Specifically, the bandwidth controller 521 monitors the amount of packets stored in the VOQ 522. The bandwidth controller 521 supplies each packet supplied from the reception-side line IFs 511 to 513 to the VOQ 522 or discards the packet depending on the priority of the packet and the result of monitoring in the VOQ 522. The bandwidth controller 521 is, for example, a processor such as a central processing unit (CPU). The bandwidth control by the bandwidth controller 521 will be described in detail below (for example, refer to FIG. 13).

The VOQ 522 includes queues 522a to 522c that are virtually separated. The VOQ 522 allocates each packet supplied from the bandwidth controller 521 to any of the queues 522a to 522c on the basis of its priority for storage. Specifically, the VOQ 522 stores packets having a class priority "High" in the queue 522a, stores packets having a class priority "Middle" in the queue 522b, and stores packets having a class priority "Low" in the queue 522c. The VOQ 522 is, for example, a random access memory (RAM).

The SPQ 523 performs the priority control in which the packets stored in the VOQ 522 are transmitted in the order based on their priorities. Specifically, the SPQ 523 supplies the packets stored in the queues 522a to 522c in the VOQ 522 to the transmission-side line IF 530 in the descending order of their class priorities. The priority control by the SPQ 523 will be described in detail below (for example, refer to FIG. 14 and FIG. 15).

Figure 6:
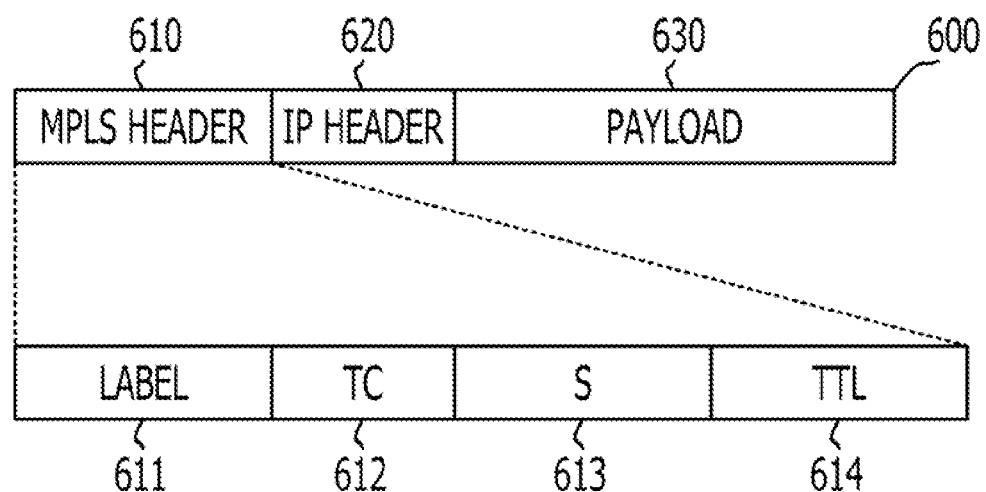
FIG. 6 illustrates a specific example of a packet transmitted from and received by the communication apparatus.

FIG. 6 illustrates a specific example of a packet transmitted from and received by the communication apparatus. An MPLS packet 600 illustrated in FIG. 6 is transmitted from and received by the communication apparatus 400. The MPLS packet 600 includes an MPLS header 610, an IP header 620, and a payload 630. The MPLS header 610 is, for example, a 32-bit area. The MPLS header 610 includes a label field 611, a TC field 612 (Exp field), an S field 613 (Bottom of Stack), and a TTL field 614 (Time To Live).

The MPLS label is stored in the label field 611. The label field 611 is, for example, a 20-bit area. The TC value is stored in the TC field 612. The TC field 612 is, for example, a three-bit area. Information for identifying the final label, among multiple labels added to the MPLS packet 600, is stored in the S field 613. The S field 613 is, for example, a one-bit area. Information indicating the life time of the MPLS packet 600 is stored in the TTL field 614. The TTL field 614 is, for example, an eight-bit area.

Figure 7:
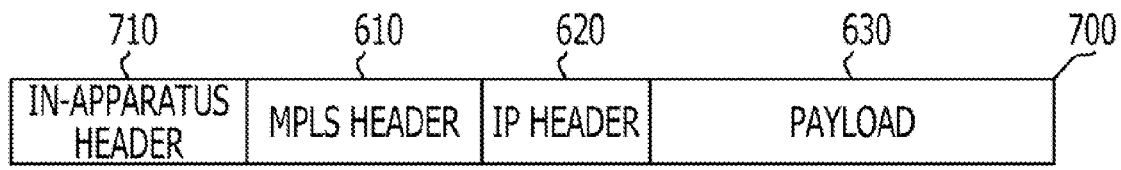
FIG. 7 illustrates a specific example of a packet output from a reception-side line IF.

FIG. 7 illustrates a specific example of a packet output from the reception-side line IF. An MPLS packet 700 illustrated in FIG. 7 is supplied from any of the reception-side line IFs 511 to 513 to the switch 420. The reception-side line IFs 511 to 513 each supply the MPLS packet 700 resulting from addition of an in-apparatus header 710 to the MPLS packet 600 illustrated in FIG. 6 to the switch 420. The in-apparatus header 710 includes, for example, the class priority and the loss priority allocated by the processor 113 (refer to FIG. 1) in any of the reception-side line IFs 511 to 513.

FIG. 8 illustrates a specific first example of the correspondence information stored in the reception-side line IF. A label table 800 illustrated in FIG. 8 is the correspondence information stored in the memory 112 (refer to FIG. 1) in any of the reception-side line IFs 511 to 513. Combinations of the labels and the TC values (the quality information) are associated with the priorities (the class priorities and the loss priorities) in the label table 800.

Specifically, the label table 800 includes the combinations of the labels and the TC values as search keys. The label is, for example, a 20-bit area. The TC value is, for example, a three-bit area. The label table 800 also includes a valid (V) flag, a color mode, a class priority, a loss priority, a destination card number, and a destination port number for each combination of the label and the TC value as search data.

The valid flag indicates whether the packet of the corresponding search key is valid or not. The valid flag is, for example, a one-bit area. The packet is valid if the valid flag is "1" and is not valid if the valid flag is "0." The processor 113 discards the packet having the valid flag "0."

The color mode (multi-color mode) indicates whether the loss priority based on the combination of the label and the TC value or the fixed loss priority is allocated to the packet of the corresponding search key. The color mode is, for example, a one-bit area. The loss priority based on the combination of the label and the TC value is allocated to the packet if the color mode is "1" and the fixed loss priority (for example, "Green") is allocated to the packet if the color mode is "0."

The class priority is used in the priority control. The class priority is, for example, a three-bit area. Packets having lower class priorities have higher priorities. For example, the class priority has a value within a range from "0" to "7." The loss priority is used in the bandwidth control. The loss priority is, for example, a one-bit area. For example, the loss priority is set to a value of "Green" or "Yellow." A packet having the loss priority "Yellow" is discarded by priority.

The destination card number indicates the line IF 410 that is the destination of the packet, among the multiple line IFs 410 in the communication apparatus 400. The destination port number indicates the line port 411 that is the destination of the packet, among the multiple line ports 411 of the line IF 410 indicated by the destination card number. The number of entries in the label table 800 is, for example, 8,388,608 (addresses "0" to "8,388,607").

The processor 113 acquires each piece of search data from the label table 800 by using the combination of the label and the TC value included in each packet as the search key. For example, the processor 113 allocates each piece of search data that is acquired to the packet and supplies the packet to which each piece of search data is allocated to the transmitter 114. Then, the packet to which each piece of search data is allocated is supplied to the switch 420.

The switch 420 performs the priority control to, for example, each packet supplied from the reception-side line IFs 511 to 513 on the basis of the class priority allocated to the packet and performs the bandwidth control to, for example, each packet supplied from the reception-side line IFs 511 to 513 on the basis of the loss priority allocated to the packet. The switch 420 supplies the packet subjected to the priority control and the bandwidth control to the line IF 410 indicated by the destination card number allocated to the packet. The line IF 410, which acquires the packet from the switch 420, transmits the packet from the line port 411 indicated by the destination port number allocated to the packet.

FIG. 9 illustrates a specific second example of the correspondence information stored in the reception-side line IF. The memory 112 in each of the reception-side line IFs 511 to 513 (refer to FIG. 1) may store a label table 901 and a TC class determination table 902 illustrated in FIG. 9 as the correspondence information. The label table 901 is first correspondence information in which the label is associated with a profile number (attribute information).

Specifically, the label table 901 includes the labels as the search keys. The label table 901 also includes a valid (V) flag, a color mode, a profile number, a destination card number, and a destination port number for each label as the search data. The profile number is attribute information that can be set for every label (for every user). The profile number is, for example, a three-bit area.

The label table 901 may include the correspondence information in which the same profile number is associated with different labels. For example, in the label table 901, the same profile number "0" is associated with labels "1", "2", and "8."

The TC class determination table 902 is second correspondence information in which each combination of the profile number (attribute information) and the TC value (the quality information) is associated with the priorities (the class priority and the loss priority). Specifically, the TC class determination table 902 includes the class priority and the loss priority associated with each address in the memory, indicated by a combination of the profile number and the TC value, as data.

The processor 113 acquires each piece of search data from the label table 901 by using the label included in each packet as the search key. The processor 113 acquires the data (the class priority and the loss priority) about the address indicated by a combination of the profile number acquired as the search data and the TC value included in the packet from the TC class determination table 902.

The number of entries in the label table 901 is 1,048,576 (addresses "0" to "1,048,575"). The number of entries in the TC class determination table 902 is 128 (addresses "0" to "127"). Accordingly, the sum of the numbers of entries in the label table 901 and the TC class determination table 902 is 1,048,704.

As described above, the profile number may be associated with the label and the priorities may be associated with each combination of the profile number (three bits) and the TC value (three bits). In this case, it is possible to reduce the size of the correspondence information stored in the memory 112, compared with the case in which the priorities are associated with each combination of the label (20 bits) and the TC value (three bits). For example, the sum (1,048,704) of the numbers of entries in the label table 901 and the TC class determination table 902 is about ⅛ of the number of entries (8,388,608) in the label table 800 illustrated in FIG. 8.

The operator can vary the profile number to be associated with the label indicating a certain user to collectively vary the policies (for example, the class priority and the loss priority) of the certain user. The operator can vary the policies (for example, the class priority and the loss priority) to be associated with a certain profile number to collectively vary the policies of the user indicated by each label associated with the certain profile number. Accordingly, it is possible to easily vary the policies of each user.

FIG. 10 illustrates a specific example of the correspondence information stored in the transmission-side line IF. A label table 1001 and a TC class determination table 1002 illustrated in FIG. 10 are the correspondence information stored in the memory 132 (refer to FIG. 2) in the transmission-side line IF 530. The label table 1001 is the correspondence information in which each label is associated with the profile number.

Specifically, the label table 1001 includes the labels as the search keys. The label table 1001 also includes a valid (V) flag, a swap flag, a profile number, and a destination port number for each label as the search data. The valid flag indicates whether the packet of the corresponding search key is valid or not. The packet is valid if the valid flag is "1" and is not valid if the valid flag is "0." The processor 113 discards the packet having the valid flag "0."

The swap flag indicates whether the TC value of the packet of the corresponding search key is overwritten or is kept. The swap flag is, for example, a one-bit area. The TC value of the packet is overwritten if the swap flag is "ON" and the TC value of the packet is kept if the swap flag is "OFF."

The profile number is attribute information that can be set for every label (for every user). The same profile number may be set for different labels in the label table 1001. The destination port number indicates the line port 411 that is the destination of the packet, among the multiple line ports 411 of the transmission-side line IF 530.

The label table 1001 may include the correspondence information in which the same profile number is associated with different labels. For example, in the label table 1001, the same profile number "0" is associated with labels "1", "2", and "8."

The TC class determination table 1002 is the correspondence information in which each combination of the profile number (attribute information) and the priorities is associated with the TC value (the quality information). Specifically, the TC class determination table 1002 includes the TC value associated with each address in the memory, indicated by a combination of the profile number (the attribute information) and the priorities (the class priority and the loss priority), as data.

The processor 133 acquires each piece of search data from the label table 1001 by using the label included in each packet as the search key. The processor 133 acquires the data (the TC value) about the address indicated by a combination of the profile number acquired as the search data and the priorities included in the packet from the TC class determination table 1002.

For example, the processor 133 overwrites the TC value of the packet with the TC value acquired from the TC class determination table 1002 if the swap flag acquired from the label table 1001 is "ON." The processor 133 keeps the TC value of the packet if the swap flag acquired from the label table 1001 is "OFF." The processor 133 transmits the packet the TC value of which is overwritten or kept from the line port 411 indicated by the destination port number acquired from the label table 1001.

As described above, the profile number may be associated with the label and the TC value may be associated with each combination of the profile number (three bits) and the priorities. In this case, it is possible to reduce the size of the correspondence information stored in the memory 132, compared with the case in which the TC value is associated with each combination of the label (20 bits) and the priorities.

The operator can vary the profile number to be associated with the label indicating a certain user to collectively vary the policies (for example, the TC value) of the certain user. The operator can vary the policies (for example, the TC value) to be associated with a certain profile number to collectively vary the policies of the user indicated by each label associated with the certain profile number. Accordingly, it is possible to easily vary the policies of each user.

However, the TC value may be associated with each combination of the label and the priorities to realize the label table 1001 and the TC class determination table 1002 by one table.

Also in this case, since the TC value corresponding to each combination of the label and the priorities is allocated to each packet, it is possible to allocate the TC value for every user. The profile number may be omitted in this case.

Figure 11:
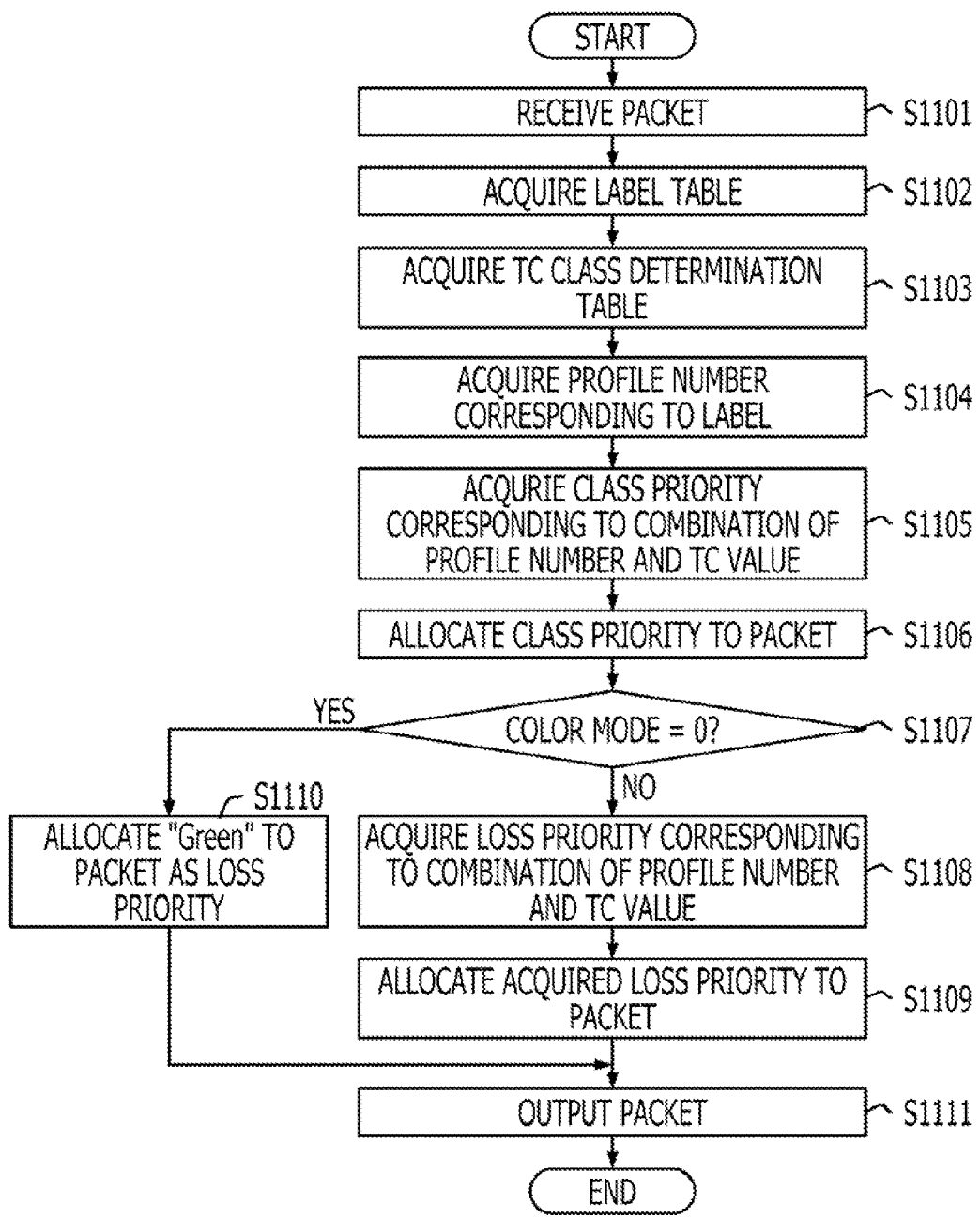
FIG. 11 is a flow chart illustrating an example of a process in the reception-side line IF.

FIG. 11 is a flow chart illustrating an example of a process in the reception-side line IF. The reception-side line IFs 511 to 513 each execute each operation illustrated in FIG. 11 each time a packet is transmitted from an external communication apparatus. Referring to FIG. 11, in Operation S1101, the receiver 111 receives a packet from an external communication apparatus. In Operation S1102, the processor 113 acquires the label table 901 stored in the memory 112. In Operation S1103, the processor 113 acquires the TC class determination table 902 stored in the memory 112.

In Operation S1104, the processor 113 acquires the profile number corresponding to the label included in the packet received in Operation S1101 on the basis of the label table 901 acquired in Operation S1102.

In Operation S1105, the processor 113 acquires the class priority corresponding to the combination of the profile number acquired in Operation S1104 and the TC value included in the packet received in Operation S1101. Specifically, the processor 113 acquires the class priority corresponding to the combination of the profile number and the TC value on the basis of the TC class determination table 902 acquired in Operation S1103. In Operation S1106, the processor 113 allocates the class priority acquired in Operation S1105 to the packet received in Operation S1101.

In Operation S1107, the processor 113 determines whether the color mode corresponding to the label included in the packet received in Operation S1101 is "0" on the basis of the label table 901 acquired in Operation S1102. If the color mode is not "0" (NO in Operation S1107), in Operation S1108, the processor 113 acquires the loss priority corresponding to the combination of the profile number acquired in Operation S1104 and the TC value included in the packet. Specifically, the processor 113 acquires the loss priority corresponding to the combination of the profile number and the TC value on the basis of the TC class determination table 902 acquired in Operation S1103.

In Operation S1109, the processor 113 allocates the loss priority acquired in Operation S1108 to the packet received in Operation S1101. Then, the process goes to Operation S1111.

If the color mode is "0" (YES in Operation S1107), in Operation S1110, the processor 113 allocates "Green" to the packet received in Operation S1101 as the loss priority. In Operation S1111, the transmitter 114 supplies the packet to which the class priority is allocated in Operation S1106 and to which the loss priority is allocated in Operation S1109 or S1110 to the switch 420. Then, the process in FIG. 11 is terminated.

Figure 12:
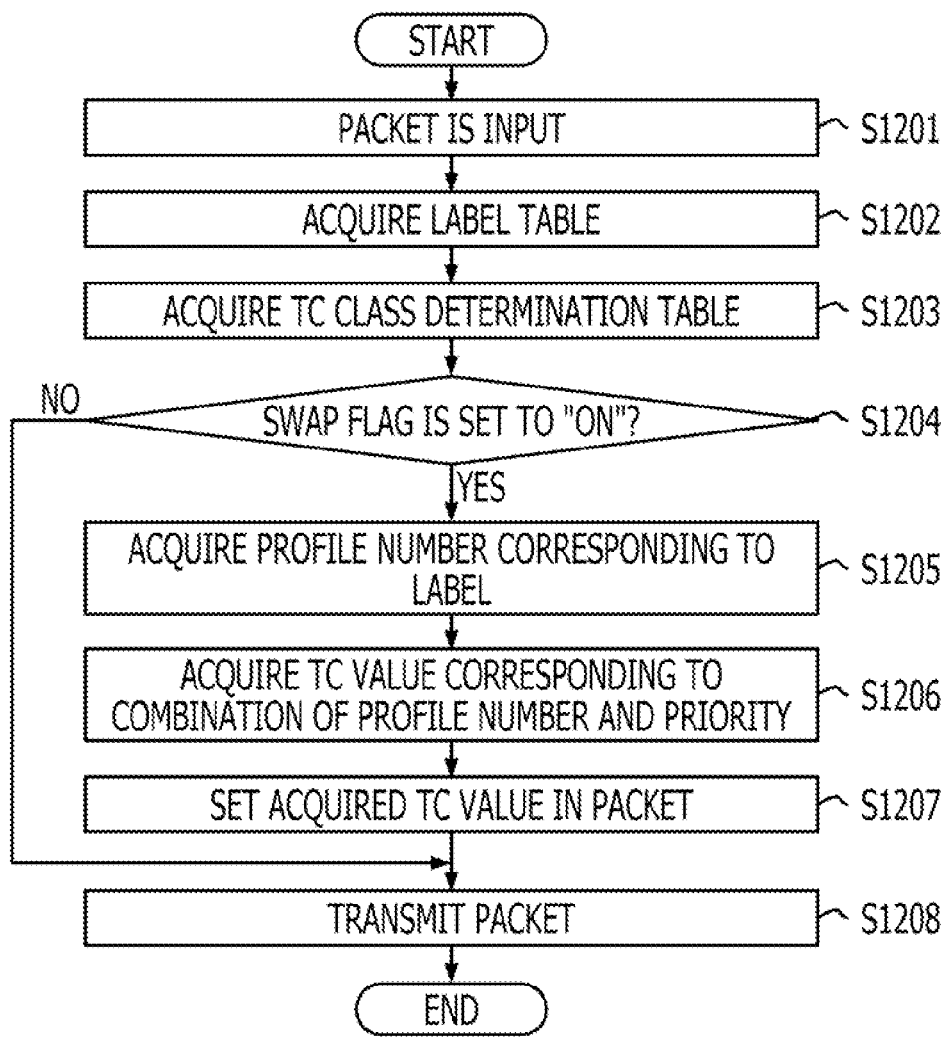
FIG. 12 is a flow chart illustrating an example of a process in the transmission-side line IF.

FIG. 12 is a flow chart illustrating an example of a process in the transmission-side line IF. The transmission-side line IF 530 executes each operation illustrated in FIG. 12, for example, each time a packet is supplied from the switch 420. Referring to FIG. 12, in Operation S1201, a packet from the switch 420 is input into the receiver 131. In Operation S1202, the processor 133 acquires the label table 1001 stored in the memory 132. In Operation S1203, the processor 133 acquires the TC class determination table 1002 stored in the memory 132.

In Operation S1204, the processor 133 determines whether the swap flag corresponding to the label included in the packet input in Operation S1201 is set to "ON" on the basis of the label table 1001 acquired in Operation S1202. If the swap flag is not set to "ON" (NO in Operation S1204), the process goes to Operation S1208.

If the swap flag is set to "ON" (YES in Operation S1204), in Operation S1205, the processor 133 acquires the profile number corresponding to the label included in the packet input in Operation S1201. Specifically, the processor 133 acquires the profile number corresponding to the label included in the packet on the basis of the label table 1001 acquired in Operation S1202.

In Operation S1206, the processor 133 acquires the TC value corresponding to the combination of the profile number acquired in Operation S1205 and the priority included in the packet input in Operation S1201. Specifically, the processor 133 acquires the TC value corresponding to the combination of the profile number and the priority on the basis of the TC class determination table 1002 acquired in Operation S1203. For example, a combination of the class priority and the loss priority is included in the packet.

In Operation S1207, the processor 133 allocates the TC value acquired in Operation S1206 in the packet input in Operation S1201. In Operation S1208, the transmitter 134 transmits the packet input in Operation S1201 to an external communication apparatus. Then, the process in FIG. 12 is terminated.

Figure 13:
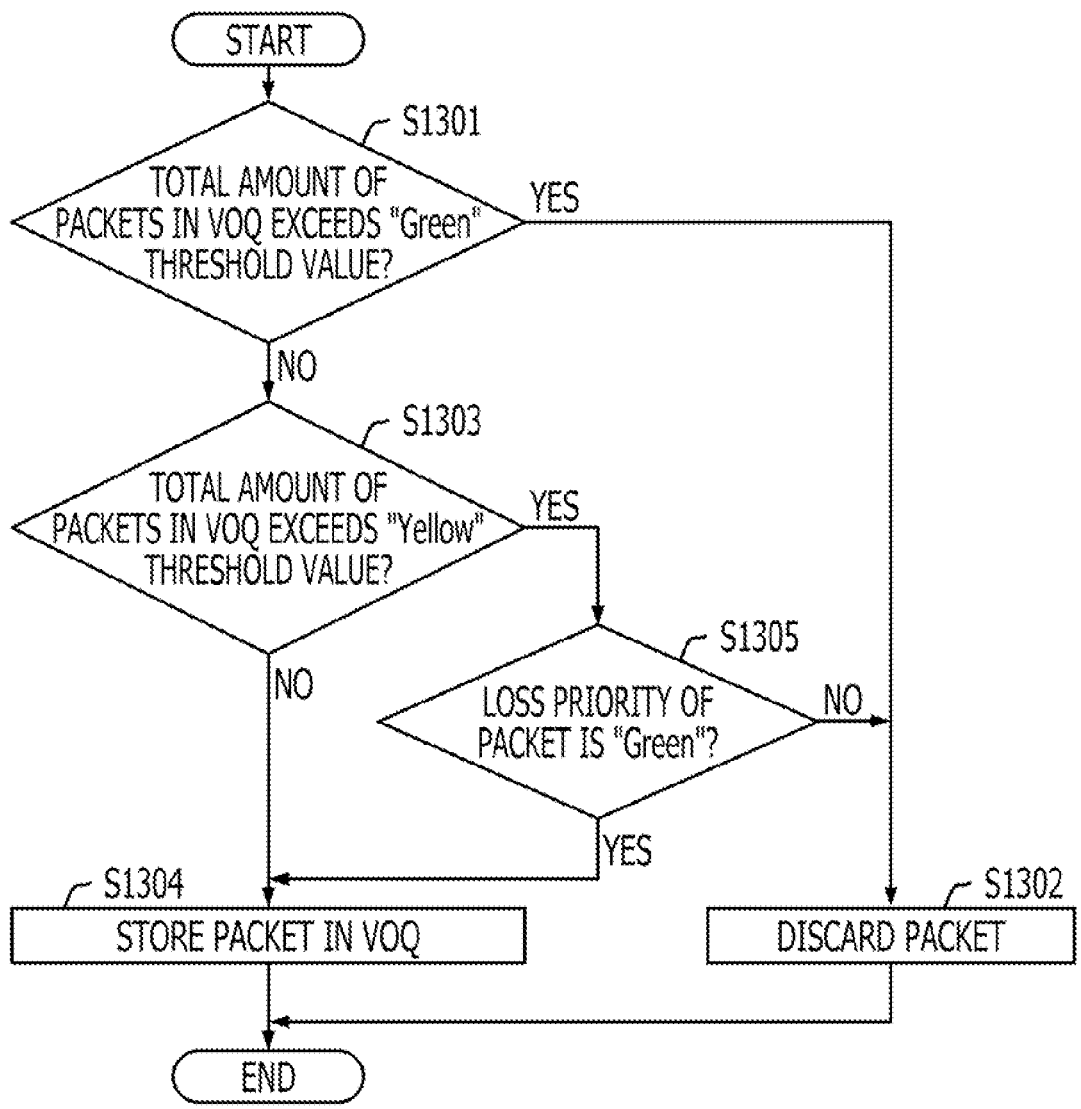
FIG. 13 is a flow chart illustrating an exemplary process of bandwidth control by a bandwidth controller.

FIG. 13 is a flow chart illustrating an exemplary process of the bandwidth control by the bandwidth controller. The bandwidth controller 521 executes, for example, each operation illustrated in FIG. 13 as the bandwidth control in which the packet supplied from the reception-side line IFs 511 to 513 is discarded depending on its priority. It is assumed here that a Green threshold value and a Yellow threshold value are set in advance in the bandwidth controller 521. The Green and Yellow threshold values are the threshold values of the loss priority allocated to the packets. The Green threshold value is higher than the Yellow threshold value.

Referring to FIG. 13, in Operation S1301, the bandwidth controller 521 determines whether the total amount of packets stored in the VOQ 522 exceeds the Green threshold value upon reception of a packet from any of the reception-side line IFs 511 to 513. If the total amount of packets exceeds the Green threshold value (YES in Operation S1301), in Operation S1302, the bandwidth controller 521 discards the received packet. Then, the process in FIG. 13 is terminated.

If the total amount of packets stored in the VOQ 522 does not exceed the Green threshold value (NO in Operation S1301), in Operation S1303, the bandwidth controller 521 determines whether the total amount of packets stored in the VOQ 522 exceeds the Yellow threshold value. If the total amount of packets does not exceed the Yellow threshold value (NO in Operation S1303), in Operation S1304, the bandwidth controller 521 stores the received packet in the VOQ 522. Then, the process in FIG. 13 is terminated.

If the total amount of packets exceeds the Yellow threshold value (YES in Operation S1303), in Operation S1305, the bandwidth controller 521 determines whether the loss priority of the received packet is "Green." If the loss priority is "Yellow" (NO in Operation S1305), the process goes to Operation S1302. If the loss priority is "Green" (YES in Operation S1305), the process goes to Operation S1304.

As described above, the bandwidth controller 521 discards the packet if the total amount of packets stored in the VOQ 522 exceeds the Green threshold value. The bandwidth controller 521 stores the packet in the VOQ 522 if the total amount of packets stored in VOQ 522 does not exceed the Yellow threshold value. The bandwidth controller 521 discard the packet having the loss priority "Yellow" and stores the packet having the loss priority "Green" in the VOQ 522 if the total amount of packets stored in the VOQ 522 is between the Green threshold value and the Yellow threshold value.

Figure 14:
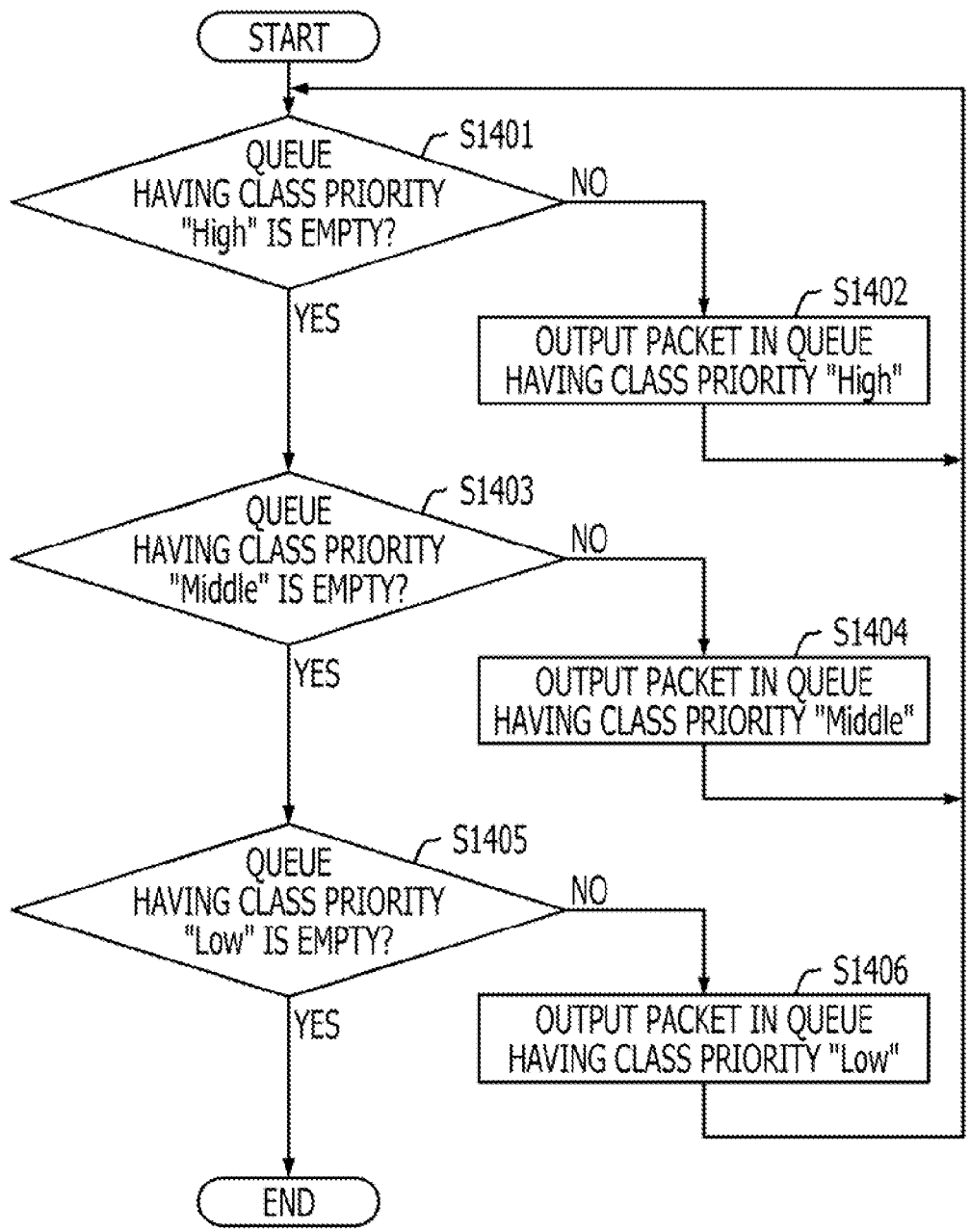
FIG. 14 is a flow chart illustrating a first exemplary process of priority control by an SPQ.

FIG. 14 is a flow chart illustrating a first exemplary process of the priority control by the SPQ. The SPQ 523 executes, for example, each operation illustrated in FIG. 14 as the priority control in which the packets stored in the VOQ 522 are transmitted in the order of their priorities. The operations illustrated in FIG. 14 indicate the priority control in a priority order mode. Referring to FIG. 14, in Operation S1401, the SPQ 523 determines whether the queue 522a having the class priority "High" in the VOQ 522 is empty.

If the queue 522a having the class priority "High" is not empty (NO in Operation S1401), in Operation S1402, the SPQ 523 supplies the packet in the queue 522a to the transmission-side line IF 530. Then, the process goes back to Operation S1401. If the queue 522a having the class priority "High" is empty (YES in Operation S1401), in Operation S1403, the SPQ 523 determines whether the queue 522b having the class priority "Middle" in the VOQ 522 is empty.

If the queue 522b having the class priority "Middle" is not empty (NO in Operation S1403), in Operation S1404, the SPQ 523 supplies the packet in the queue 522b to the transmission-side line IF 530. Then, the process goes back to Operation S1401. If the queue 522b having the class priority "Middle" is empty (YES in Operation S1403), in Operation S1405, the SPQ 523 determines whether the queue 522c having the class priority "Low" in the VOQ 522 is empty.

If the queue 522c having the class priority "Low" is not empty (NO in Operation S1405), in Operation S1406, the SPQ 523 supplies the packet in the queue 522c to the transmission-side line IF 530. Then, the process goes back to Operation S1401. If the queue 522c having the class priority "Low" is empty (YES in Operation S1405), the process in FIG. 14 is terminated. In the priority control in the priority order mode, the SPQ 523 does not extract the packet from the queue having a lower priority until the queues having higher priorities become empty, as described above.

Figure 15:
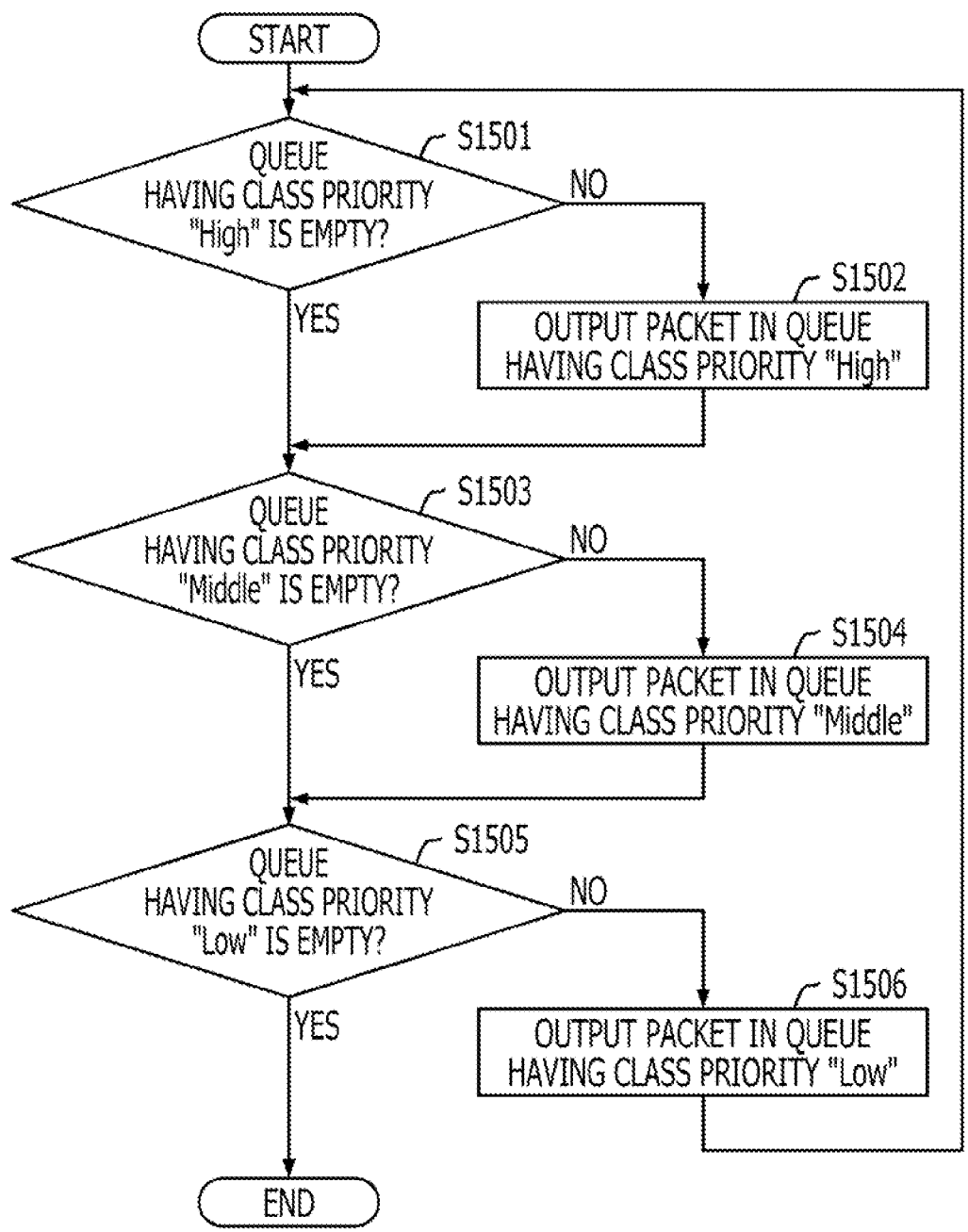
FIG. 15 is a flow chart illustrating a second exemplary process of the priority control by the SPQ.

FIG. 15 is a flow chart illustrating a second exemplary process of the priority control by the SPQ. The SPQ 523 executes, for example, each operation illustrated in FIG. 15 as the priority control in which the packets stored in the VOQ 522 are transmitted in the order of their priorities. The operations illustrated in FIG. 15 indicate the priority control in a round robin mode. Referring to FIG. 15, in Operation S1501, the SPQ 523 determines whether the queue 522a having the class priority "High" in the VOQ 522 is empty.

If the queue 522a having the class priority "High" is not empty (NO in Operation S1501), in Operation S1502, the SPQ 523 supplies the packet in the queue 522a to the transmission-side line IF 530. Then, the process goes to Operation S1503. If the queue 522a having the class priority "High" is empty (YES in Operation S1501), in Operation S1503, the SPQ 523 determines whether the queue 522b having the class priority "Middle" in the VOQ 522 is empty.

If the queue 522b having the class priority "Middle" is not empty (NO in Operation S1503), in Operation S1504, the SPQ 523 supplies the packet in the queue 522b to the transmission-side line IF 530. Then, the process goes to Operation S1505. If the queue 522b having the class priority "Middle" is empty (YES in Operation S1503), in Operation S1505, the SPQ 523 determines whether the queue 522c having the class priority "Low" in the VOQ 522 is empty.

If the queue 522c having the class priority "Low" is not empty (NO in Operation S1505), in Operation S1506, the SPQ 523 supplies the packet in the queue 522c to the transmission-side line IF 530. Then, the process goes back to Operation S1501. If the queue 522c having the class priority "Low" is empty (YES in Operation S1505), the process in FIG. 15 is terminated.

In the priority control in the round robin mode, the SPQ 523 sequentially extracts one stored packet, at a maximum, from the queues having higher class priorities, as described above. The SPQ 523 may switch the priority order mode illustrated in FIG. 14 and the round robin mode illustrated in FIG. 15 in response to a user's setting for the priority control.

As described above, according to the reception apparatus, the communication apparatus, the transmission apparatus, the receiving method, and the transmitting method, it is possible to realize the flexible packet transfer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception apparatus comprising:
a memory configured to store a table of correspondence information in which each combination of a label and quality information is associated with a priority level;
a receiver configured to receive a plurality of multi-protocol label switching (MPLS) packets each including a label field for storing a label and a traffic class (TC) field for storing quality information, the plurality of MPLS packets including a Label-only-inferred per hop behavior (PHB) scheduling class (PSC) LSP (L-LSP) packet and a EXP-inferred PSC LSP (E-LSP) packet, the label field of the L-LSP packet being used to store a value indicating priority of the L-LSP packet as a label, the TC field of the E-LSP packet being used to store a value indicating priority of the E-LSP packet as quality information;
a processor configured to allocate, to each received MPLS packet whose label field and TC field store a first label and first quality information, respectively, as a first combination of a label and quality information, a first priority level that is associated with the first combination of a label and quality information in the table of the correspondence information; and
a transmitter configured to supply the each MPLS packet to which the first priority level is allocated, to a switch that performs transfer control of the each MPLS packet based on the allocated first priority level, wherein
the same table of correspondence information is used for each of the L-LSP packet and the E-LSP packet.

2. The reception apparatus according to claim 1,
wherein the memory stores first correspondence information in which the label is associated with attribute information and second correspondence information in which each combination of the attribute information and the quality information is associated with the priority as the correspondence information, and
wherein the processor acquires the attribute information corresponding to the label included in the packet from the first correspondence information, acquires the priority corresponding to the combination of the acquired attribute information and the quality information from the second correspondence information, and allocates the acquired priority to the packet.

3. The reception apparatus according to claim 2,
wherein the memory stores the first correspondence information including a correspondence in which the same attribute information is associated with different labels.

4. The reception apparatus according to claim 1,
wherein the switch performs the transfer control including priority control in which the packets are transferred in an order based on their priorities.

5. The reception apparatus according to claim 1,
wherein the switch performs the transfer control including bandwidth control in which the packets are discarded based on their priorities.

6. The reception apparatus according to claim 1, wherein the quality information is a TC value of an MPLS packet, the TC value is used as a search key to search the correspondence information.

7. The reception apparatus according to claim 6, wherein a packet in which a search key that is determined invalid by the processor is discarded.

8. The reception apparatus according to claim 6, wherein the search key is a combination of the label and the TC value.

9. The reception apparatus according to claim 1, wherein the processor allocates the priority level even when the L-LSP packet is not differentiated from the E-LSP packet.

10. The reception apparatus according to claim 1, wherein
the correspondence information stores each combination of a label and quality information in association with one of priority levels so as to allow different combinations of a label and quality information to be associated with an identical priority level; and
the reception apparatus is configured to, upon receiving MPLS packets including the different combinations of a label and quality information, allocate the identical priority level to the received different packets so as to transfer the received MPLS packets based on the allocated identical priority level.

11. A communication apparatus comprising:
a reception apparatus including:
 a memory configured to store a table of correspondence information in which each combination of a label and quality information is associated with a priority level,
 a receiver that receives a plurality of multi-protocol label switching (MPLS) packets each including a label field for storing a label and a traffic class (TC) field for storing quality information, the plurality of MPLS packets including a Label-only-inferred per hop behavior (PHB) scheduling class (PSC) LSP (L-LSP) packet and a EXP-inferred PSC LSP (E-LSP) packet, the label field of the L-LSP packet being used to store a value indicating priority of the L-LSP packet as a label, the TC field of the E-LSP packet being used to store a value indicating priority of the E-LSP packet as quality information,
 a processor that allocates, to each received MPLS packet whose label field and TC field store a first label and first quality information, respectively, as a first combination of a label and quality information, a first priority level that is associated with the first combination of a label and quality information in the table of the correspondence information, and
 a transmitter that transmits the each MPLS packet to which the first priority level is allocated by the processor;
a switch configured to perform transfer control of the each MPLS packet supplied from the transmitter based on the allocated first priority level; and
a transmission apparatus configured to transmit the each MPLS packet subjected to the transfer control in the switch, wherein
the same table of correspondence information is used for each of the L-LSP packet and the E-LSP packet.

12. A receiving method comprising:
storing a table of correspondence information in which each combination of a label and quality information is associated with a priority level;
receiving a plurality of multi-protocol label switching (MPLS) packets each including a label field for storing a label and a traffic class (TC) field for storing quality information, the plurality of MPLS packets including a Label-only-inferred per hop behavior (PHB) scheduling class (PSC) LSP (L-LSP) packet and a EXP-inferred PSC LSP (E-LSP) packet, the label field of the L-LSP packet being used to store a value indicating priority of the L-LSP packet as a label, the TC field of the E-LSP packet being used to store a value indicating priority of the E-LSP packet as quality information;
allocating, to each received MPLS packet whose label field and TC field store a first label and first quality information, respectively, as a first combination of a label and quality information, a first priority level that is associated with the first combination of a label and quality information in the table of the correspondence information; and
supplying the each MPLS packet to which the first priority level is allocated, to a switch that performs transfer control of the each packet based on the allocated first priority level, wherein
the same table of correspondence information is used for each of the L-LSP packet and the E-LSP packet.

* * * * *